(12) United States Patent
Chen et al.

(10) Patent No.: US 11,017,342 B2
(45) Date of Patent: May 25, 2021

(54) GENERATING A COMBINED ENTITY WORKFLOW

(71) Applicant: ENTIT Software LLC, Sunnyvale, CA (US)

(72) Inventors: Rotem Chen, Yehud (IL); Hava Babay Adi, Yehud (IL); Shlomi Chovel, Yehud (IL); Ran Biron, Yehud (IL)

(73) Assignee: MICRO FOCUS LLC, Santa Clara, CA (US)

( * ) Notice: Subject to any disclaimer, the term of this patent is extended or adjusted under 35 U.S.C. 154(b) by 63 days.

(21) Appl. No.: 15/753,255

(22) PCT Filed: Aug. 31, 2015

(86) PCT No.: PCT/US2015/047789
§ 371 (c)(1),
(2) Date: Feb. 16, 2018

(87) PCT Pub. No.: WO2017/039623
PCT Pub. Date: Mar. 9, 2017

(65) Prior Publication Data
US 2018/0240051 A1    Aug. 23, 2018

(51) Int. Cl.
*G06Q 10/06* (2012.01)
*G06F 8/60* (2018.01)
(Continued)

(52) U.S. Cl.
CPC ........... *G06Q 10/0633* (2013.01); *G06F 8/60* (2013.01); *G06F 8/70* (2013.01); *G06F 9/44505* (2013.01); *G06Q 10/06* (2013.01); *G06F 9/542* (2013.01)

(58) Field of Classification Search
CPC .... G06F 8/60–70; G06F 9/44505–542; G06Q 10/063–067; G06Q 10/06–067
See application file for complete search history.

(56) References Cited

U.S. PATENT DOCUMENTS 7,062,537 B2 * 6/2006 Aziz ...................... G06Q 10/10
709/206
7,403,948 B2 * 7/2008 Ghoneimy ............. G06Q 99/00
707/792

(Continued)

OTHER PUBLICATIONS

Muller et al., "AGENTWORK: a workflow system supporting rule-based workflow adaptation", published by Data & Knowledge Engineering 51 (2004) 223-256 (Year: 2004).*

(Continued)

*Primary Examiner* — S. Sough
*Assistant Examiner* — Zheng Wei

(57) ABSTRACT

Example implementations relate to generating a combined entity workflow. For example, a method for generating a combined entity workflow may include defining, using a workflow engine, a business logic block for each of a plurality of information technology (IT) entity types within an IT system, wherein the business logic block comprises a non-scripted declarative business rule, defining, for each of the plurality of entity types and using the workflow engine, a relationship between the business logic block and a model workflow for the respective entity type, and generating, using the workflow engine, a combined entity workflow for each of the plurality of entity types, by combining the business logic block and the model workflow.

20 Claims, 4 Drawing Sheets

(51) Int. Cl.
*G06F 8/70* (2018.01)
*G06F 9/445* (2018.01)
*G06F 9/54* (2006.01)

(56) References Cited

U.S. PATENT DOCUMENTS

| | | | | |
|---|---|---|---|---|
| 7,711,694 | B2* | 5/2010 | Moore | G06Q 10/06 707/608 |
| 7,818,714 | B2* | 10/2010 | Ryan | G06F 8/10 717/104 |
| 7,962,436 | B2 | 6/2011 | Brelage | |
| 8,140,362 | B2* | 3/2012 | Deshpande | G06N 5/025 705/7.11 |
| 8,255,490 | B1* | 8/2012 | Porter | G06Q 10/06 709/219 |
| 8,332,864 | B2 | 12/2012 | Bose | |
| 8,521,758 | B2* | 8/2013 | Nachnani | G06F 16/24532 707/758 |
| 8,533,022 | B2* | 9/2013 | Krishnan Nair | G06Q 10/0639 705/7.23 |
| 8,737,960 | B2* | 5/2014 | Kim | G06Q 30/04 455/405 |
| 8,867,346 | B2* | 10/2014 | Ghai | H04L 43/12 370/230 |
| 9,639,830 | B2* | 5/2017 | Rodriguez | G06Q 10/0633 |
| 9,672,524 | B2* | 6/2017 | Papa | G06F 16/13 |
| 9,830,135 | B2* | 11/2017 | Tripathi | G06F 8/60 |
| 9,852,382 | B2* | 12/2017 | Rangaswamy | G06Q 10/06 |
| 10,504,075 | B2* | 12/2019 | Rodriguez | G06Q 30/04 |
| 2002/0032692 | A1* | 3/2002 | Suzuki | G06Q 10/10 |
| 2003/0033191 | A1* | 2/2003 | Davies | G06Q 10/06 705/7.14 |
| 2003/0217127 | A1* | 11/2003 | Sinn | G06Q 10/06 709/223 |
| 2004/0098284 | A1* | 5/2004 | Petito | G06Q 50/167 705/316 |
| 2004/0162741 | A1* | 8/2004 | Flaxer | G06Q 10/10 705/7.26 |
| 2005/0043982 | A1* | 2/2005 | Nguyen | G06Q 10/06316 705/7.26 |
| 2005/0102249 | A1* | 5/2005 | Bigus | G06N 5/04 706/47 |
| 2006/0074734 | A1* | 4/2006 | Shukla | G06F 8/10 717/107 |
| 2006/0101034 | A1* | 5/2006 | Murphy | G06Q 10/10 |
| 2006/0234548 | A1 | 10/2006 | Qing et al. | |
| 2006/0259603 | A1 | 11/2006 | Shrader et al. | |
| 2006/0294506 | A1* | 12/2006 | Dengler | G06F 8/71 717/131 |
| 2007/0094199 | A1* | 4/2007 | Deshpande | G06N 5/025 706/47 |
| 2007/0094306 | A1* | 4/2007 | Kyriazakos | G06Q 10/10 |
| 2007/0150329 | A1* | 6/2007 | Brook | G06Q 10/06 705/7.13 |
| 2008/0040455 | A1* | 2/2008 | MacLeod | G06F 8/61 709/220 |
| 2008/0109270 | A1* | 5/2008 | Shepherd | G06Q 10/06 705/7.26 |
| 2008/0320486 | A1* | 12/2008 | Bose | G06Q 10/06 718/105 |
| 2009/0119500 | A1* | 5/2009 | Roth | G06Q 10/06 713/100 |
| 2010/0049740 | A1* | 2/2010 | Iwase | G06F 19/321 705/7.27 |
| 2011/0161284 | A1* | 6/2011 | Tewari | G06F 16/254 707/609 |
| 2011/0282709 | A1 | 11/2011 | Rangaswamy et al. | |
| 2012/0278873 | A1* | 11/2012 | Calero | G06F 21/6218 726/7 |
| 2013/0275085 | A1* | 10/2013 | Cheng | G06Q 10/0639 702/182 |
| 2013/0339943 | A1 | 12/2013 | Mallya | |
| 2014/0122377 | A1 | 5/2014 | Goodman | |
| 2014/0129550 | A1* | 5/2014 | Weatherhead | G06Q 10/103 707/723 |
| 2014/0222493 | A1* | 8/2014 | Mohan | G06Q 10/06316 705/7.26 |
| 2014/0278631 | A1 | 9/2014 | Karuppusamy | |
| 2015/0212812 | A1 | 7/2015 | Tripathi | |
| 2015/0286969 | A1* | 10/2015 | Warner | G06Q 10/0633 705/7.27 |
| 2016/0063424 | A1* | 3/2016 | Zeng | G06F 16/24565 705/7.28 |
| 2016/0124929 | A1* | 5/2016 | Kharbanda | G06F 17/243 715/223 |
| 2016/0182544 | A1* | 6/2016 | Adjaoute | H04L 63/1416 705/7.15 |
| 2018/0032980 | A1* | 2/2018 | Rodriguez | G06Q 20/102 |

OTHER PUBLICATIONS

International Searching Authority, International Search Report and Written Opinion, dated May 16, 2020, 9 pgs.
Wedemeijer., "Abstracting Imperative Workflow to Declarative Business Rules" Retrieved from http://wiki.tarski.nl/images/d/d6/ 2013BMSD_LexWedemeijer_ImperativeWorkflow_to_Dec.

* cited by examiner

GENERATING A COMBINED ENTITY WORKFLOW

BACKGROUND

A process can be managed by creating a workflow to accomplish the tasks of the process. A workflow is a representation of a state machine that holds the information on valid states for each related entity and how to transform between those states. For example, a workflow can represent the activities (e.g., states) and relationships (e.g., transitions) between the activities of a process to fulfill an offering, such as a request for support or a request for service.

DETAILED DESCRIPTION

Figure 1:
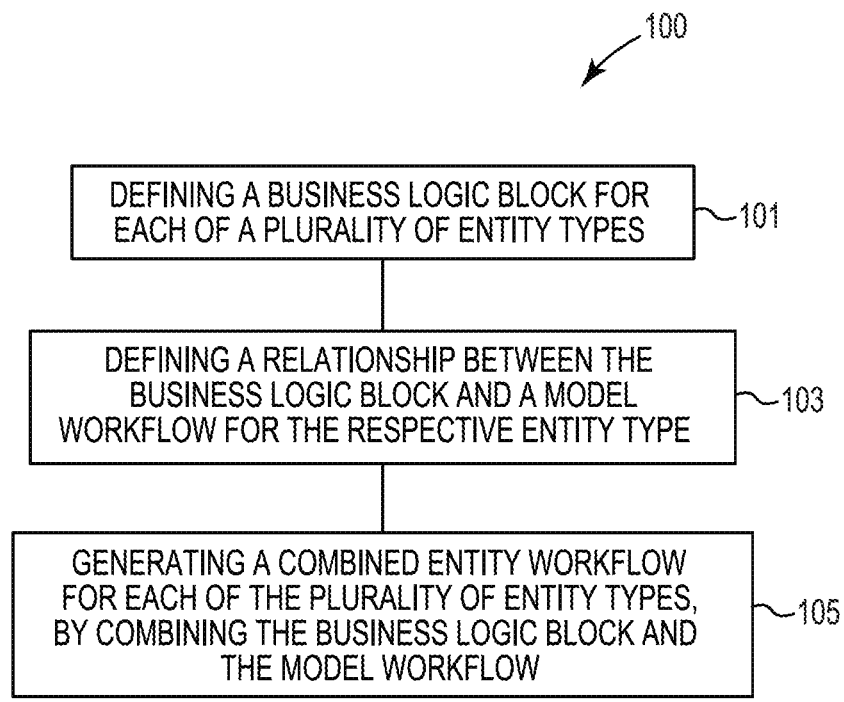
FIG. 1 illustrates an example method for generating a combined entity workflow, according to the present disclosure.

Workflows may be classified into entity types. A workflow may be managed via a workflow product. As used herein, a "workflow product" represents an application of executable instructions that maintain a workflow when the executable instructions are executed on circuitry, such as a processor resource. A workflow product may include the capability to allow a user to customize a workflow. For example, a product may include business logic associated with a service desk of related entities with a workflow for each class of entity. Business logic may include instructions, such as data structures or functions, which produce a part of a workflow.

Workflows may be classified into entity types, where the entity types are based on the type of management process to be executed in the workflow and may further depend on how the management process is modeled. For example, model entities may include a request entity, a change entity, and/or an incident entity. As used herein, a request entity may refer to a support request, a service request, and/or other types of requests received from users of an information technology (IT) system, such as an information technology operations management (ITOM) system or an information technology service management (ITSM) system. Each entity type may be associated with a particular workflow structure based on business logic. For instance, a request entity may have a first default workflow structure, while a change entity may have a second default workflow structure that is different from the first default workflow structure. Further, each entity type may be associated with a predefined workflow lifecycle comprising a plurality of states where in each state, there is a predefined business logic that should be applied when the entity type is in that state.

In accordance with the present disclosure, there may be many entity types, such as: a request, a change, an incident, an offering, and a change model, among others. Some of these entity types may be defined as model entity types, for example, the "offering" entity type may be classified as the model entity for the "request" entity type. As such, every "request" created may be based on a model which is of the entity type "offering".

Because the model entities may include broader classifications, users may wish to customize parts of the workflow associated with an entity type to, for example, comply with a particular practice. For instance, an entity type may be modified to comply with particular infrastructure requirements such as specification requirements for hardware components, and/or prior authorizations for hardware purchases, among others. Since an entity type may rely on a defined, common workflow for all instances of that entity type, customizations of an entity type may be difficult. It may be possible to include business logic relevant to the entity type within the entity type's workflow. However, such processes may be problematic and complicated since the entity types' specific business logic may be inserted with a condition on the type of the entity. Since many such business logic blocks may be inserted for each different instance of an entity type, the entity type's workflow may quickly become convoluted and unreadable.

Similarly, entity type workflows may be modified through added business logic but may require that the business logic be based solely on a scripting language. This requires that the business logic added into the model entity includes a script that would run during the workflow of the entity type. This process may be very difficult to maintain and may be especially difficult to transfer with upgrades due to the complexity of the scripting language.

By contrast, generating a combined entity workflow in accordance with the present disclosure may include incorporation of reusable blocks of business logic, composed of individual business rules, into the workflow. A user may add blocks of business logic comprised of non-scripted declarative business rules to the workflow of an entity type. As used herein, non-scripted declarative business rules refers to rules that are written in a language other than a scripted language and are descriptive in nature. For example, a non-scripted declarative business rule may read "If a request is made for a new device, then the request must be approved by a manager." Examples are not so limited however, and other non-scripted declarative business rules may be used in various examples of the present disclosure.

The added business logic blocks may be defined to run during each state or transition of the entity type's workflow and may be defined to run before the model workflow logic and/or after the model workflow logic. As a result, the workflow may be able to easily extend through additions of business logic blocks from different sources while still remaining readable.

Furthermore, because the generated combined entity workflow uses added non-scripted declarative blocks of business rules instead of relying on a scripting language, the modifications made to an entity type's workflow may be easier to maintain as compared to rules relying on a scripting language. In addition, the combined entity workflows may be preserved when the underlying model entity workflow undergoes upgrades. As used herein, the "underlying model entity workflow" refers to the entity type's workflow that is modified with business logic blocks to generate the combined entity workflow.

Once additional business logic blocks have been defined with respect to a particular entity type, the modified workflow may remain available for subsequent transactions that rely on the same entity type. When a workflow engine executes a transaction on an entity type, the workflow engine may query the model entity to obtain the blocks of business logic defined for the entity type and generate the combined entity workflow therefrom. Thus, a user of the workflow system may be able to define the additional business logic block once on the model entity. The workflow engine may then use the added business logic block to generate a modified workflow for all entities that are based on the entity type.

FIG. 1 illustrates an example method 100 for generating a combined entity workflow according to the present disclosure. At 101, the method 100 may include defining, using a workflow engine, a business logic block for each of a plurality of information technology (IT) entity types within an IT system, such as an information technology operations management (ITOM) system or information technology service management (ITSM) system. As used herein, an "engine" can include a combination of hardware and programming, but at least hardware, that is configured to perform actions described herein. For instance, a workflow engine may include a combination of hardware and programming, but at least hardware, that is configured to perform various actions associated with generating and/or executing a workflow. Defining a business logic block may include receiving by the workflow engine, particular instructions that are to be executed during a particular state and/or transition within the workflow.

The business logic block may comprise a non-scripted declarative business rule. As described herein, non-scripted declarative business rules refers to rules that are written in a language other than a scripted language and are descriptive in nature. Put another way, a non-scripted declarative business rule refers to a non-imperative format of computer executed instructions in which desired results are recited without explicitly listing specific commands and/or steps that must be performed.

At 103, the method 100 may include defining, for each of the plurality of entity types and using the workflow engine, a relationship between the business logic block and a model workflow for the respective entity type. For instance, defining the relationship between the defined business logic block and the model workflow includes defining the business logic block to execute at each state for the entity type. Similarly, defining the relationship between the defined business logic block and the model workflow may include defining the business logic block to execute before execution of the model workflow. In another example, defining the relationship between the defined business logic block and the model workflow may include defining the business logic to execute after execution of the model workflow.

At 105, the method 100 may include generating, using the workflow engine, a combined entity workflow for each of the plurality of entity types, by combining the business logic block and the model workflow. Put another way, the underlying model workflow for the entity type may be combined with the defined business logic block to generate the combined entity workflow. Furthermore, the combined entity workflow may be generated during runtime of all entities that are based on the model workflow.

In some examples, the method 100 may further include receiving a plurality of entities from users of the IT system, and determining for each of the plurality of entities, an entity type among the plurality of entity types. For example, the workflow engine may receive from a first user, a request for a device such as a tablet computer, a change request from a second user to change a setting on a particular device, and a report from a third user identifying a particular incident. In response to receiving each of these entities, the workflow engine may determine that the entity associated with the first user is a request entity type, the entity associated with the second user is a change entity type, and the entity associated with the third user is an incident entity type.

Also, in some examples, the method 100 may further include executing, using the workflow engine, the combined entity workflow for each entity having the entity type associated with the combined entity workflow. As described further herein, the workflow engine may execute the combined entity workflow within the IT system every time that particular entity type is executed.

Figure 2:
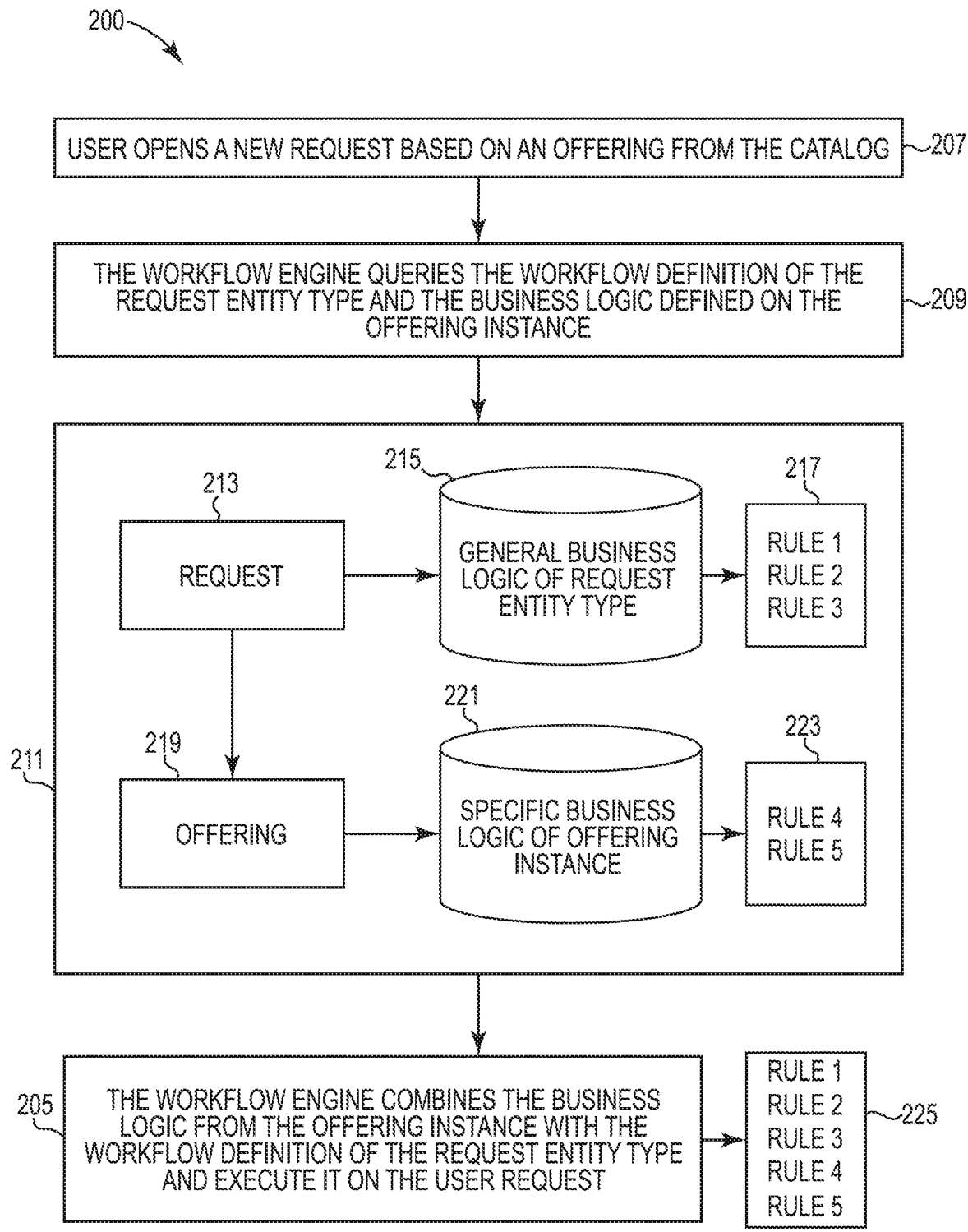
FIG. 2 further illustrates an example method for generating a combined entity workflow, according to the present disclosure.

FIG. 2 further illustrates an example method 200 for generating a combined entity workflow according to the present disclosure. While FIG. 2 illustrates an example method pertaining to a request entity type, the following description is for illustrative purposes only. The method 200 applies equally to other entity types, as described herein.

As illustrated at 207 in FIG. 2, the method 200 may include a user opening a new request based on an offering from a catalog. For instance, the IT system (e.g. ITOM or ITSM system) may maintain a catalog of hardware products, software products, and/or services among other offerings. The user may select an offering from the catalog and thereby open a new request, e.g., entity.

As illustrated at 209, the method 200 may include a workflow engine querying the workflow definition of the request entity type and the business logic defined on the offering instance. For example, as illustrated at 211, the request 213 received from the user at 207 may be classified as a "request" entity type and may be associated with a general workflow specific to that entity type. Put another way, request 213 may be associated with general business logic blocks 215 based on the request entity type. As illustrated in FIG. 2, the "request" entity type may be associated with rules 217, particularly "rule 1", "rule 2" and "rule 3". As described herein, "rules" refer to non-scripted declarative business rules that define business logic blocks. As described herein, non-scripted declarative business rules refers to rules that are written in a language other than a scripted language and are descriptive in nature. Put another way, a non-scripted declarative business rule refers to a non-imperative format of computer executed instructions in which desired results are recited without explicitly listing specific commands and/or steps that must be performed.

As illustrated in FIG. 2, the offering 219 associated with the request 213 may have associated specific business logic blocks 221. For instance, if the request 213 is for a particular hardware device, such as a tablet computer, the offering 219 may be an offering in a catalog or repository within the IT system for hardware devices, among other offerings. The offering 221 may be associated with specific logic blocks for that particular offering, comprising rules 223, e.g., rule 4 and rule 5. Put another way, an IT system may offer products and/or services via a catalog or other repository available to users in the IT system. A user may request an offering, such as a request for installation of a particular computer monitor. The offering for all services may have specific business logic blocks comprising rules 4 and 5, while the request for installation of a computer monitor, e.g., an entity type of "service request", may have business logic blocks associated with installation of computer monitors, e.g., rules 1, 2, and 3.

As illustrated at 205 in FIG. 2, the workflow engine may combine the business logic blocks from the offering instance with the workflow definition of the request entity type and execute the combination on the user request. Put another way, the workflow engine may execute rules 225, comprising rules 1, 2, 3, 4, and 5. As discussed in relation to FIG.

1 and elsewhere, the business logic blocks 215 associated with the request 213 may be constructed based on a model workflow plus defined business logic blocks.

Figure 3:
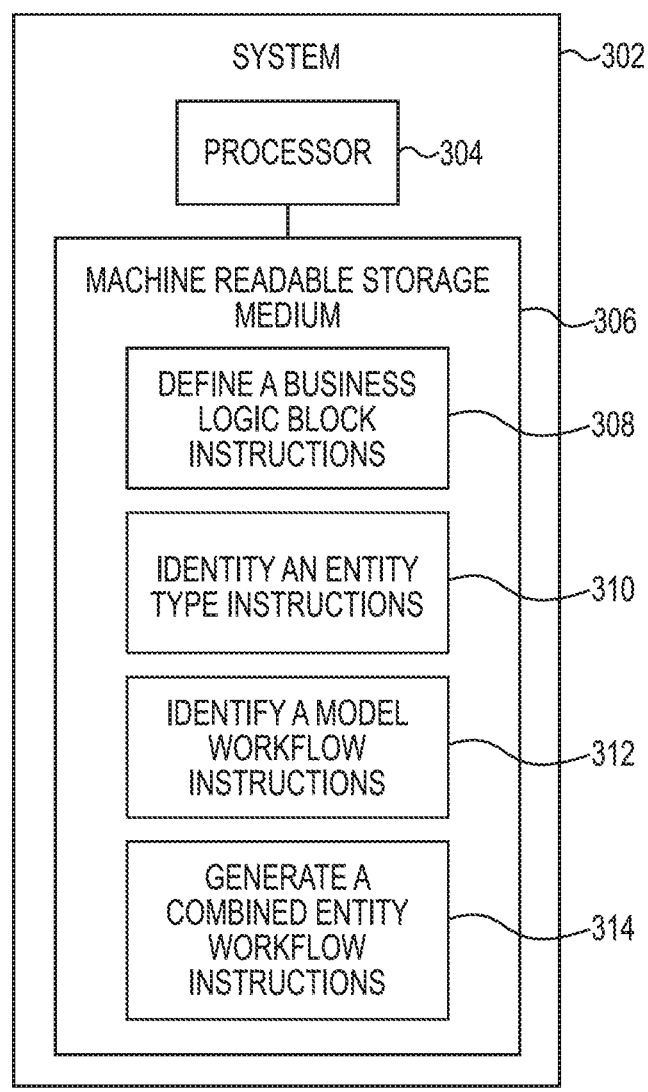
FIG. 3 is a block diagram of an example system for generating a combined entity workflow, according to the present disclosure.

FIG. 3 is a block diagram of an example system 302 for generating a combined entity workflow, according to the present disclosure. System 302 may perform the methods 100 and/or 200 illustrated in FIGS. 1 and 2, respectively. System 302 may include at least one computing device that is capable of communicating with at least one remote system. In the example of FIG. 3, system 302 includes a processor 304 and a machine-readable storage medium 306. Although the following descriptions refer to a single processor 304 and a single machine-readable storage medium 306, the descriptions may also apply to a system with multiple processors 304 and multiple machine-readable storage mediums 306. In such examples, the instructions may be distributed, e.g., stored, across multiple machine-readable storage mediums 306 and the instructions may be distributed, e.g., executed, across multiple processors 304.

Processor 304 may include a central processing unit (CPU), microprocessor, and/or other hardware devices suitable for retrieval and execution of instructions stored in machine-readable storage medium 306. In the particular example shown in FIG. 3, processor 304 may receive, determine, and send instructions 308, 310, 312, 314 for generating a combined entity workflow. In addition to retrieving and executing instructions, processor 304 may include electronic circuits comprising a number of electronic components for performing the functionality of the instructions in machine-readable storage medium 306. With respect to the executable instruction representations, e.g., boxes, described and shown herein, it should be understood that part or all of the executable instructions and/or electronic circuits included within one box may, in alternate embodiments, be included in a different box shown in the figures or in a different box not shown.

Machine-readable storage medium 306 may be any electronic, magnetic, optical, or other physical storage device that stores executable instructions. Thus, machine-readable storage medium 306 may be, for example, Random Access Memory (RAM), an Electrically-Erasable Programmable Read-Only Memory (EEPROM), a storage drive, an optical disc, and the like. Machine-readable storage medium 306 may be disposed within system 302, as shown in FIG. 3. In this situation, the executable instructions may be "installed" on the system 302. Similarly, machine-readable storage medium 306 may be a portable, external or remote storage medium, for example, that allows system 302 to download the instructions from the portable/externall remote storage medium. In this situation, the executable instructions may be part of an "installation package". As described herein, machine-readable storage medium 306 may be encoded with executable instructions for monitoring network utilization.

Defining a business logic block instructions 308, when executed by a processor e.g., 304, may cause system 302 to define a business logic block for each of a plurality of IT entity types within an IT system (e.g. ITOM or ITSM system). The business logic block may comprise a non-scripted declarative business rule. As described herein, non-scripted declarative business rules refers to rules that are written in a language other than a scripted language and are descriptive in nature. Put another way, a non-scripted declarative business rule refers to a non-imperative format of computer executed instructions in which desired results are recited without explicitly listing specific commands and/or steps that must be performed.

In some examples, the business logic block instructions 308 may define the business logic block for each entity type in a particular state. For instance, as described herein, a state may be one of entity logged, entity performed, entity closed. The define a business logic block instructions 308 may define during which state and/or transition the defined business logic block should be executed.

Identifying an entity type instructions 310, when executed by a processor 304, may cause system 302 to identify an entity type for each of a plurality of entities in the IT system. For instance, as discussed in relation to FIGS. 1 and 2, an entity may be associated with an entity type of requests, incidents, change requests, and/or problems, among other entity types.

Identifying a model workflow instructions 312, when executed by a processor 304, may cause system 302 to identify a model workflow for each of the identified entity types. For instance, referring to FIG. 2, a particular entity type may be associated with a model workflow, comprising only rules 1 and 2. In such an example, the business logic blocks including rules 1 and 2 comprise the model workflow.

Generate a combined entity workflow instructions 314, when executed by a processor 304, may cause system 202 to generate a combined entity workflow including the model workflow and the defined business logic block. For instance, referring to FIG. 2, a business logic block comprising rule 3 can be added to the workflow, and the combined business logic blocks including rules 1, 2, and 3 can comprise the combined entity workflow for the particular entity type.

Figure 4:
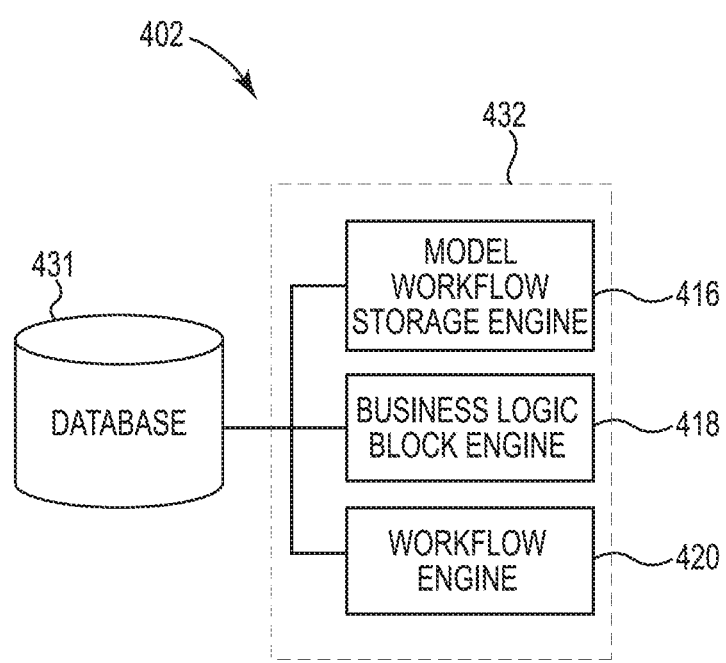
FIG. 4 is a diagram of an example system for generating a combined entity workflow, according to the present disclosure.

FIG. 4 is a diagram of an example system 402 for generating a combined entity workflow, according to the present disclosure. The system 402 may be analogous to the system 302 illustrated in FIG. 3. As shown in the example of FIG. 4, the system 402 can include a database 431 accessible by and in communication with a plurality of combined workflow engines 432. The combined workflow engines 432 can include a model workflow storage engine 416, a business logic block engine 418, and a workflow engine 420. The system 402 can include additional or fewer engines than illustrated to perform the various functions described herein, and embodiments are not limited to the example shown in FIG. 4. The system 402 can include hardware, firmware, and programming, which in cooperation can form a computing device as discussed in connection with FIG. 3. Hardware can be in the form of transistor logic and/or application specific integrated circuitry (ASICs). Further, programming can be in the form of machine-readable and executable instructions (e.g., program instructions or programming) stored in a machine-readable medium (MRM).

The plurality of engines, e.g., 416, 418, 420, as used herein can include a combination of hardware and programming (e.g., program instructions), but at least includes hardware, that is configured to perform particular functions, tasks and/or actions. For example, as illustrated in FIG. 4, the system 402 may include a model workflow storage engine 416 to store a model workflow for each respective entity type among a plurality of IT entity types within an IT system (e.g. ITOM system or ITSM system). For instance, the model workflow storage engine 416 may store model workflows based on entity type.

Also, the system 402 may include a business logic block engine 418 to store a business logic block for each of the respective entity types. For instance, the business logic block engine 418 may store a business logic block for a plurality of business logic blocks for each entity type. As described herein, the business logic block may be a non-scripted declarative business rule. Non-scripted declarative business rules refers to rules that are written in a language other than a scripted language and are descriptive in nature. Put another way, a non-scripted declarative business rule refers to a non-imperative format of computer executed instructions in which desired results are recited without explicitly listing specific commands and/or steps that must be performed.

Further, the system 402 may include a workflow engine 420 to generate a combined entity workflow for each of the respective entity types by combining the business logic block with the associated model workflow and execute the combined entity workflow on all entities in the IT system having the associated entity type, as described in relation to FIG. 1, FIG. 2, and FIG. 3.

In some examples, the workflow engine 420 may determine an entity type in response to receipt of an entity from a user of the IT system. Also, the workflow engine 420 may query the model workflow storage engine 416, requesting delivery of the model workflow corresponding, to the identified entity type. For instance, in response to determining an entity type corresponding to an entity, the workflow engine 420 may request from the model workflow storage engine 416, the model workflow corresponding to that entity type.

Moreover, the workflow engine 420 may query the business logic block engine 418 requesting delivery of the business logic block corresponding to the identified entity type. For instance, in response to receiving the model workflow for the entity type, the workflow engine 420 may request from the business logic block engine 418, the additional logic blocks associated with the determined entity type.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. Further, as used herein, "a number of" an element and/or feature can refer to one or more of such elements and/or features.

As used herein, "logic" is a processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor.

What is claimed:

1. A method comprising:
   accessing, by a hardware processor, a storage medium storing a plurality of model workflows associated with different entity types of entities within an information technology (IT) system, wherein each model workflow of the plurality of model workflows is a representation of a process to fulfill a service, including states in the process and transitions between the states;
   storing, by the hardware processor, in the storage medium, business logic blocks associated with the different entity types, wherein each business logic block of the business logic blocks includes instructions to produce a part of one of the plurality of model workflows;
   receiving, by the hardware processor, an entity;
   determining, by the hardware processor, that the received entity is of a first entity type selected from among the different entity types;
   in response to determining that the received entity is of the first entity type, obtaining, by the hardware processor, from among the plurality of model workflows stored in the storage medium, a first model workflow associated with the first entity type, and obtaining, from among the business logic blocks stored in the storage medium, a first business logic block associated with the first entity type, wherein the first business logic block includes a first non-scripted declarative business rule, wherein the first non-scripted declarative business rule is a rule written in a non-imperative format of computer-executed instructions in which a specific result for the first entity type is recited without listing specific steps to be performed to generate the specific result;
   defining, by the hardware processor, a relationship between the first business logic block and the first model workflow for executing the first business logic block in relation to the first model workflow;
   adding, by the hardware processor, the first non-scripted declarative business rule of the first business logic block to the first model workflow based on the defined relationship to generate a combined entity workflow for the first entity type; and
   executing, by the hardware processor, the combined entity workflow on the received entity.

2. The method of claim 1, further comprising:
   receiving, by the hardware processor, a further entity;
   identifying, for the further entity, a second entity type from among the different entity types;
   in response to the identifying of the second entity type, obtaining, from among the plurality of model workflows stored in the storage medium, a second model workflow associated with the second entity type, and obtaining, from among the business logic blocks stored in the storage medium, a second business logic block including a second non-scripted declarative business rule associated with the second entity type; and
   adding, by the hardware processor, the second non-scripted declarative business rule of the second business logic block to the second model workflow to generate a further combined entity workflow for the second entity type.

3. The method of claim 2, further comprising:
   executing, by the hardware processor, the further combined entity workflow on the further entity.

4. The method of claim 1, wherein the defining of the relationship between the first business logic block and the first model workflow includes defining the first business logic block to execute at states of the first model workflow.

5. The method of claim 1, wherein the defining of the relationship between the first business logic block and the first model workflow includes defining the first business logic block to execute before execution of the first model workflow.

6. The method of claim 1, wherein the defining of the relationship between the first business logic block and the first model workflow includes defining the first business logic block to execute after execution of the first model workflow.

7. The method of claim 1, wherein each business logic block of the business logic blocks is associated with a corresponding event type of different event types and is executed during execution of a respective model workflow associated with the corresponding event type.

8. The method of claim 1, wherein the different entity types comprise a request entity type corresponding to a request received from a user, and an incident entity type corresponding to an incident in the IT system.

9. The method of claim 8, wherein the different entity types further comprise a change request entity type corresponding to a change of a device setting.

10. The method of claim 1, wherein the executing of the combined entity workflow comprises executing the combined entity workflow for each of multiple entities based on the first entity type.

11. A non-transitory machine readable medium storing machine-readable instructions that upon execution cause a processor to:
access a storage medium storing a plurality of model workflows associated with different entity types of entities within an information technology (IT) system, wherein each model workflow of the plurality of model workflows is a representation of a process to fulfill a service, including states in the process and transitions between the states;
store, in the storage medium, business logic blocks associated with the different entity types, wherein each business logic block of the business logic blocks includes instructions to produce a part of one of the plurality of model workflows;
receive an entity;
identify that the received entity is of a first entity type selected from among the different entity types;
in response to identifying that the received entity is of the first entity type, obtain, from among the plurality of model workflows stored in the storage medium, a first model workflow associated with the first entity type, and obtain, from among the business logic blocks stored in the storage medium, a first business logic block associated with the first entity type, wherein the first business logic block includes a first non-scripted declarative business rule, wherein the first non-scripted declarative business rule is a rule written in a non-imperative format of computer-executed instructions in which a specific result for the first entity type is recited without listing specific steps to be performed to generate the specific result;
define a relationship between the first business logic block and the first model workflow for executing the first business logic block in relation to the first model workflow;
add the first non-scripted declarative business rule of the first business logic block to the first model workflow based on the defined relationship to generate a combined entity workflow; and
execute the combined entity workflow on the received entity.

12. The non-transitory machine readable medium of claim 11, wherein the different entity types comprise at least two selected from:
a support request entity type;
an incident report entity type;
a change request entity type; and
a problem report entity type.

13. The non-transitory machine readable medium of claim 11, wherein the first business logic block is executable at states of the first model workflow.

14. The non-transitory machine readable medium of claim 13, wherein the states of the first model workflow represent one of:
an entity logged;
an entity performed; and
an entity closed.

15. The non-transitory machine readable medium of claim 11, wherein the machine-readable instructions upon execution cause the processor to:
receive a further entity;
identify, for the further entity, a second entity type from among the different entity types;
in response to the identifying of the second entity type, obtain, from among the plurality of model workflows stored in the storage medium, a second model workflow associated with the second entity type, and obtain, from among the business logic blocks stored in the storage medium, a second business logic block including a second non-scripted declarative business rule associated with the second entity type; and
add the second non-scripted declarative business rule of the second business logic block to the second model workflow to generate a further combined entity workflow for the second entity type.

16. The non-transitory machine readable medium of claim 11, wherein the machine-readable instructions cause the processor to execute the combined entity workflow for each of multiple entities based on the first entity type.

17. A system comprising:
a processor; and
a non-transitory storage medium comprising machine-readable instructions executable to cause the processor to:
store a plurality of model workflows associated with different entity types of entities within an information technology (IT) system, wherein each model workflow of the plurality of model workflows is a representation of a process to fulfill a service, including states in the process and transitions between the states;
store business logic blocks associated with the different entity types, wherein each business logic block of the business logic blocks includes instructions to produce a part of one of the plurality of model workflows;
receive an entity;
identify that the received entity is of a first entity type selected from among the different entity types;
in response to identifying that the received entity is of the first entity type, obtain, from among the stored plurality of model workflows, a first model workflow associated with the first entity type, and obtain, from among the stored business logic blocks, a first business logic block associated with the first entity type, wherein the first business logic block includes a first non-scripted declarative business rule, wherein the first non-scripted declarative business rule is a rule written in a non-imperative format of computer-executed instructions in which a specific result for the first entity type is recited without listing specific steps to be performed to generate the specific result;

define a relationship between the first business logic block and the first model workflow for executing the first business logic block in relation to the first model workflow;

add the first non-scripted declarative business rule to the first model workflow based on the defined relationship to generate a combined entity workflow for the first entity type; and execute the combined entity workflow on the received entity.

18. The system of claim 17, wherein the IT system comprises an IT service management (ITSM) system.

19. The system of claim 17, wherein the machine-readable instructions are executable to cause the processor to:
receive a further entity;
identify, for the further entity, a second entity type from among the different entity types;
in response to identifying of the second entity type, obtain, from among the stored plurality of model workflows, a second model workflow associated with the second entity type, and obtain, from among the stored business logic blocks, a second business logic block including a second non-scripted declarative business rule associated with the second entity type; and
add the second non-scripted declarative business rule of the second business logic block to the second model workflow to generate a further combined entity workflow for the second entity type.

20. The system of claim 17, wherein each business logic block of the business logic blocks is associated with a corresponding event type of the different event types and is executed during execution of a respective model workflow associated with the corresponding event type.

* * * * *